United States Patent
Alberti

(10) Patent No.: US 10,514,537 B2
(45) Date of Patent: Dec. 24, 2019

(54) INSTALLATION FOR IMPROVING THE BINOCULAR VISUAL FIELD

(71) Applicant: E.V.S. SOCIETÁ A RESPONSABILITÁ LIMITATA SEMPLIFICATA, Milan (IT)

(72) Inventor: Alessandro Umberto Alberti, Cusago (IT)

(*) Notice: Subject to any disclaimer, the term of this patent is extended or adjusted under 35 U.S.C. 154(b) by 294 days.

(21) Appl. No.: 15/565,162

(22) PCT Filed: Apr. 12, 2016

(86) PCT No.: PCT/IB2016/052064
§ 371 (c)(1),
(2) Date: Oct. 8, 2017

(87) PCT Pub. No.: WO2016/166656
PCT Pub. Date: Oct. 20, 2016

(65) Prior Publication Data
US 2018/0143428 A1    May 24, 2018

(30) Foreign Application Priority Data
Apr. 13, 2015 (IT) .............................. VE2015A0015

(51) Int. Cl.
*G02B 27/00* (2006.01)

(52) U.S. Cl.
CPC .................. *G02B 27/0081* (2013.01)

(58) Field of Classification Search
CPC ............. G03F 7/70225; G03F 7/70341; G03F 7/70275; G03F 7/70308; G03F 7/70066; G03F 7/7015; G03F 7/70108; G03F 7/70191; G03F 7/70241; G03F 7/70666; G03F 7/70966; G03F 7/70058; G03F 7/70075; G03F 7/70083; G03F 7/70141; G03F 7/70158; G03F 7/70166; G03F 7/70175; G03F 7/702; G03F 7/70233; G03F 7/7025; G03F 7/70258; G03F 7/70283; G03F 7/70358; G03F 7/70566; G03F 7/70591; G03F 7/706; G03F 7/70975; G03F 7/70983; G02B 13/143; G02B 17/08; G02B 17/0892; G02B 27/0025; G02B 13/0095; G02B 13/22; G02B 17/0844; G02B 17/0856; G02B 3/0062; G02B 13/14; G02B 15/177; G02B 17/0663; G02B 17/0804; G02B 17/0808; G02B 19/0028; G02B 21/04; G02B 21/241; G02B 21/361;

(Continued)

(56) References Cited

U.S. PATENT DOCUMENTS 4,116,529 A    9/1978  Yamaguchi
7,280,283 B1   10/2007 Kasai

FOREIGN PATENT DOCUMENTS

GB          1493244        11/1977

*Primary Examiner* — Collin X Beatty
*Assistant Examiner* — Grant A Gagnon
(74) *Attorney, Agent, or Firm* — Themis Law

(57) ABSTRACT

An installation for improving the binocular visual field includes a structural element located at a distance from the observer equal to or greater than the observer's interpupillary distance. The structural element is provided with at least one through aperture, in which an optical system is applied that has two convergent lenses, between which a divergent lens is centrally interposed, the distance between each of the convergent lenses and the central divergent lens being such as to make the optical system of a neutral afocal type.

18 Claims, 5 Drawing Sheets

Figure 1:
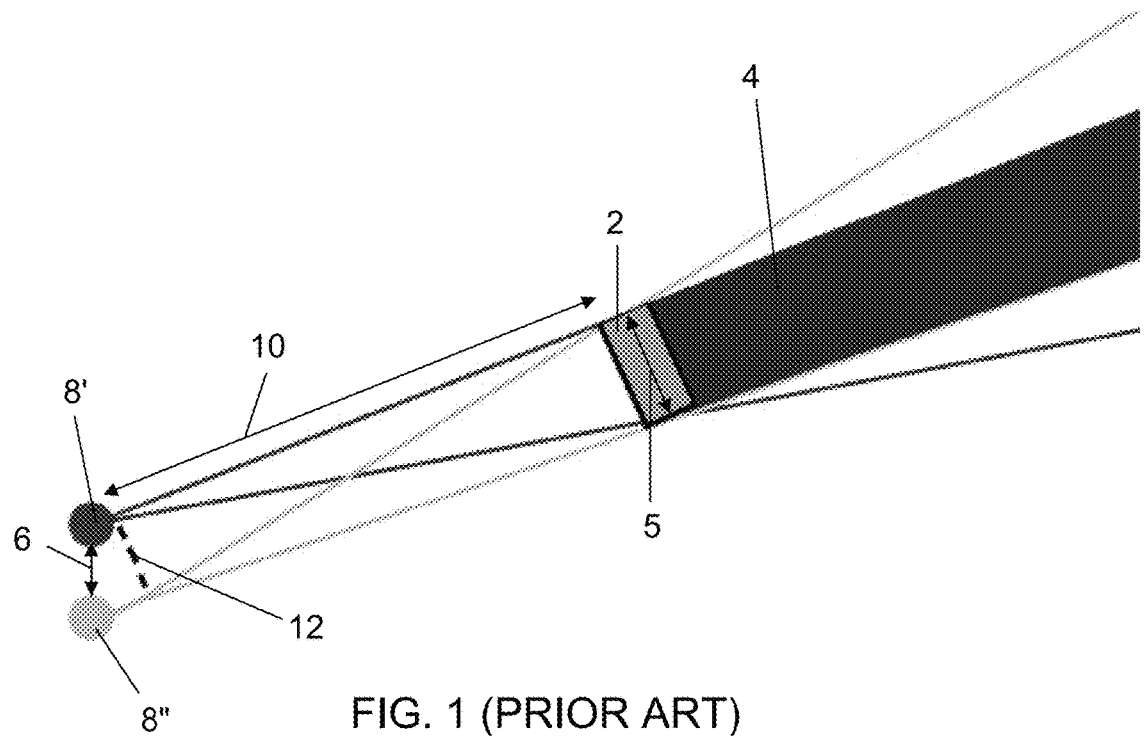

(58) Field of Classification Search
CPC ........ G02B 23/00; G02B 23/12; G02B 23/14; G02B 23/2476; G02B 23/26; G02B 27/0012; G02B 27/0927; G02B 27/286; G02B 3/0006; G02B 3/005; G02B 3/0056; G02B 3/0068; G02B 3/08; G02B 3/14; G02B 5/045; G02B 7/025; G02B 13/00; G02B 13/0005; G02B 13/001; G02B 13/003; G02B 13/0035; G02B 13/0085; G02B 13/02; G02B 13/04; G02B 13/10; G02B 13/16; G02B 13/18; G02B 13/24; G02B 13/26; G02B 15/04; G02B 15/10; G02B 15/14; G02B 17/04; G02B 17/045; G02B 17/0605; G02B 17/0657; G02B 17/0812; G02B 17/0848; G02B 17/0852; G02B 17/0884; G02B 19/0023; G02B 19/0033; G02B 19/0047; G02B 19/0057; G02B 19/0061; G02B 1/02; G02B 1/06; G02B 2027/011; G02B 2027/0129; G02B 2027/0178; G02B 21/02; G02B 21/082; G02B 21/086; G02B 23/165; G02B 23/18; G02B 23/2407; G02B 23/243; G02B 23/2446; G02B 23/2453; G02B 23/2469; G02B 25/004; G02B 25/005; G02B 26/005; G02B 26/10; G02B 26/121; G02B 26/124; G02B 26/127; G02B 27/0018; G02B 27/0101; G02B 27/0172; G02B 27/026; G02B 27/0905; G02B 27/0911; G02B 27/095; G02B 27/0955; G02B 27/0977; G02B 27/0988; G02B 27/102; G02B 27/126; G02B 27/144; G02B 27/4211; G02B 27/4283; G02B 27/48; G02B 27/646; G02B 3/0018; G02B 3/0031; G02B 3/0037; G02B 5/005; G02B 5/0278; G02B 5/04; G02B 5/18; G02B 5/1809; G02B 5/1814; G02B 5/1847; G02B 5/1852; G02B 5/1885; G02B 5/1895; G02B 5/202; G02B 5/3091; G02B 6/0028; G02B 6/0053; G02B 6/262; G02B 6/2746; G02B 6/325; G02B 6/3604; G02B 6/3636; G02B 6/3644; G02B 7/002; G02B 7/004; G02B 7/02; G02B 7/021; G02B 7/028; G02B 7/06; G02B 7/10; G02B 7/102; G02B 7/1805; G02B 7/183; G02B 9/34
USPC ........................................................ 359/362
See application file for complete search history.

INSTALLATION FOR IMPROVING THE BINOCULAR VISUAL FIELD

The present invention relates to an installation for improving the binocular visual field.

In the presence of structural uprights, and of structural elements in general, binocular vision is partially covered and obstructed by their bulk. In particular, the width of the portion of vision covered is inversely proportional to the distance of the upright from the eyes.

This drawback is particularly dangerous in the transport sector in general and in the automobile sector in particular. In this respect, the vertical structural uprights of the vehicle partly obstruct lateral vision, possibly preventing the driver from being aware of the presence of small-dimension shapes (such as pedestrians, cyclists and motorcyclists), with the risk of causing accidents and/or collisions.

Moreover, during recent decades, for safety reasons aimed mainly at lessening the consequences if motor vehicles overturn, the vertical uprights of passenger compartments have been increasingly thickened, leading inevitably to the presence of increasingly wider zones in which normal binocular vision is obstructed.

Correspondingly, in the building context, the structural elements supporting a building, together with its door and window frames, reduce outward vision and the lighting of its inner rooms. In particular, the upright or the joining portion interposed between two transparent elements generally defines a visual interruption such as to compromise the visual impression of the observed object.

GB 1493244 describes a method for indicating the alignment discrepancy between a reference point or reference axis relative to a fixed axis. In particular, it describes the use of an afocal optical system comprising an arrangement of lenses about a common optical axis, for determining the positioning errors of a work table with respect to the operating cutting head.

U.S. Pat. No. 7,280,283 describes an endoscopic objective optical system consisting of a series of different lens groups disposed in sequence. In particular, this system is highly complex and comprises four lens groups: a first group comprising a convex meniscus lens, a second group comprising a positive lens, a third lens group comprising at least one concave refractive surface and having a positive overall refracting power, and a fourth lens group having positive refracting power and comprising a negative meniscus lens and a double-convex lens. In addition, a diaphragm is provided between the first and second lens groups.

U.S. Pat. No. 4,892,399 describes a monocular vision viewer to be installed in a door, to enable the observer to view persons positioned in front of the door. This viewer comprises a complex optical system formed from two prisms placed horizontally one on the other, a convex frontal lens, an intermediate plano-convex lens, and a convex rear lens.

U.S. Pat. No. 4,257,670 describes a monocular vision viewer to be installed in a door. In particular, it comprises an optical system formed from three lens groups, and in particular a first lens group comprising a meniscus lens and a double-convex lens, a second lens group comprising five plano-convex lenses positioned equidistantly apart, and a third lens group comprising a plano-convex lens.

The object of the present invention is to provide an installation which, when in the presence of obstacles which obstruct the visual field, enables binocular vision to be improved without causing any optical aberration.

Another object of the invention is to provide an installation which enables the vision portion covered by obstacles present within the visual field to be reduced, eliminated and/or rendered non-influential.

Another object of the invention is to provide an installation which, when a joining portion is present between two transparent elements, enables the visual perception of an observed zone defined by said portion to be eliminated, hence creating vision continuity between the two transparent elements.

Another object of the invention is to provide an installation which is of simple, quick and low-cost production.

Another object of the invention is to provide an installation which can also be applied easily and quickly to already existing structures.

Another object of the invention is to provide an installation which does not involve only monocular vision and/or which does not require the observer to bring the eye substantially into contact with the installation itself, as instead is required for the viewer.

All these objects, and others which will be apparent from the ensuing description, are attained, according to the invention, by an installation and by a structural element with the characteristics described hereinafter.

Figure 2:
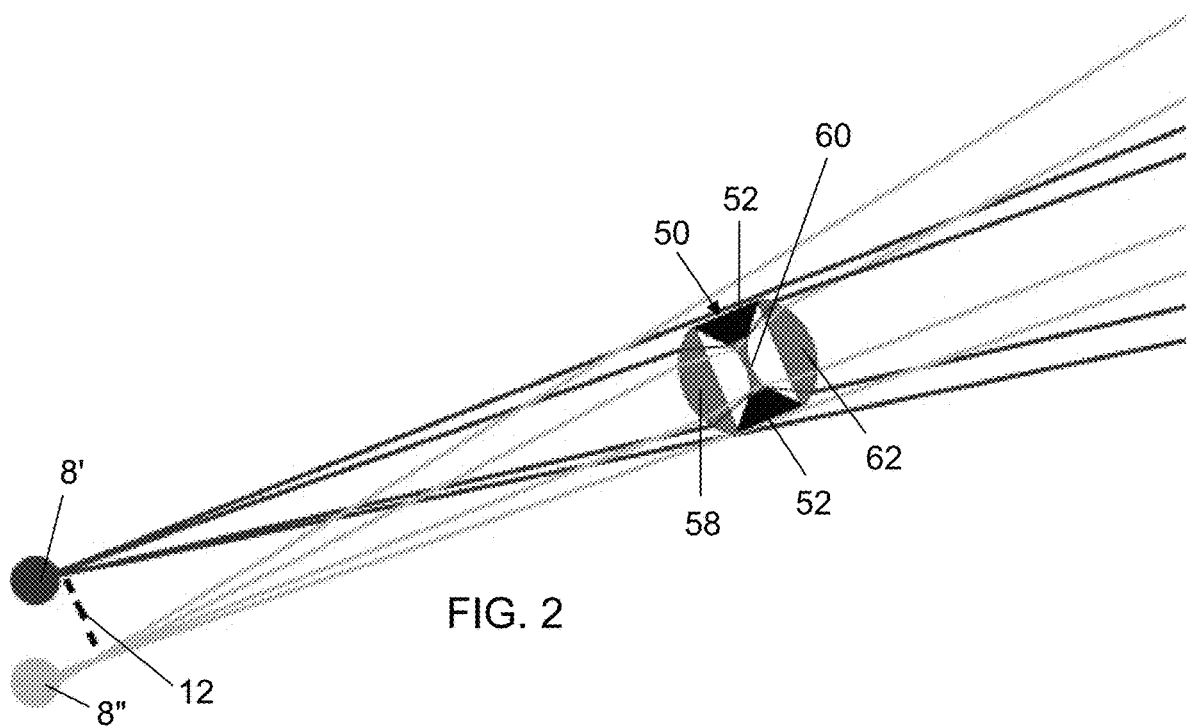
Figure 3:
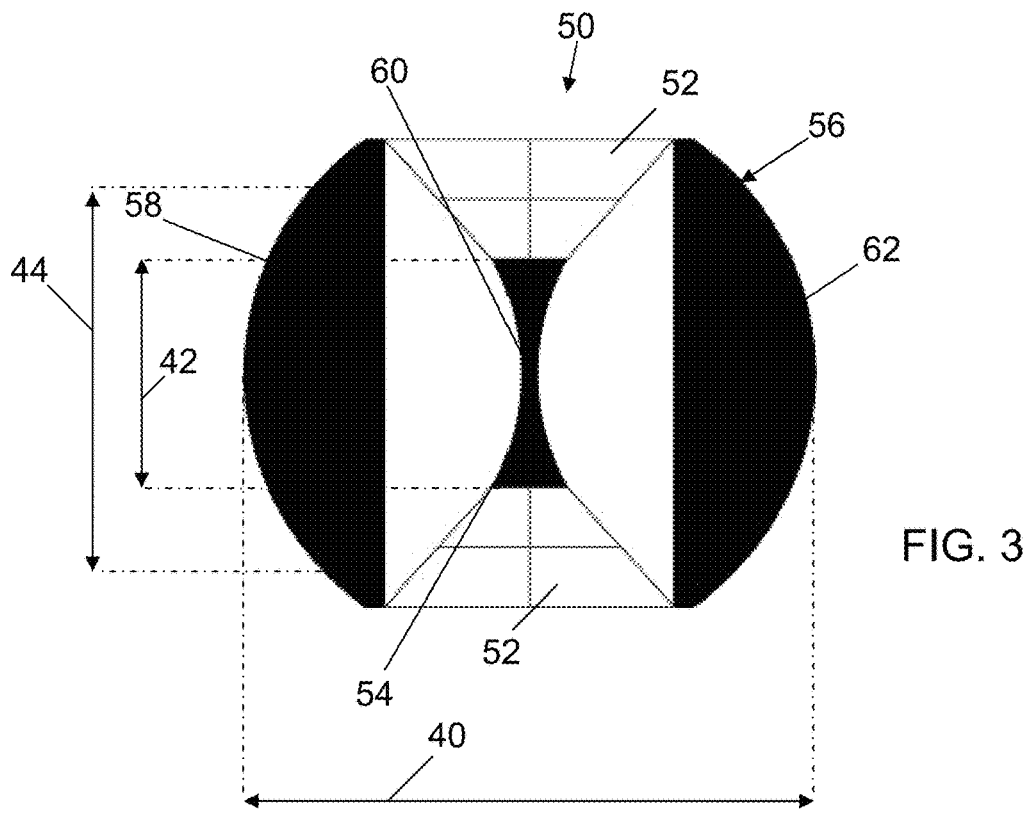
Figure 4:
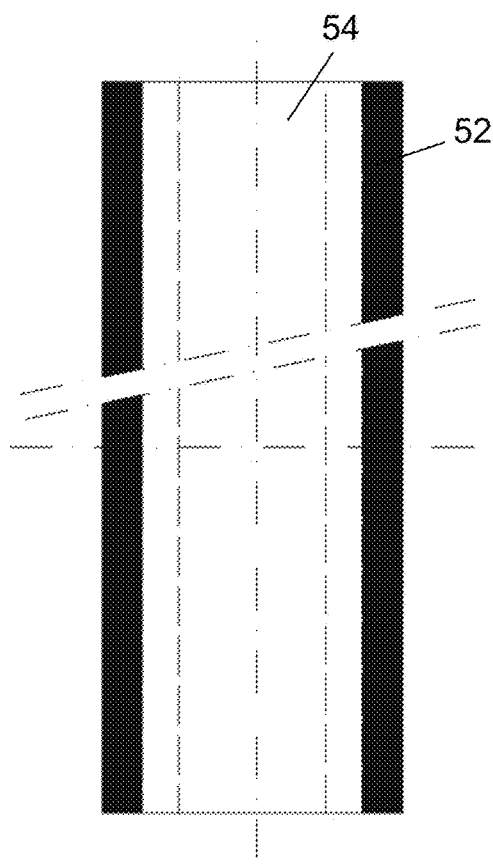
Figure 5:
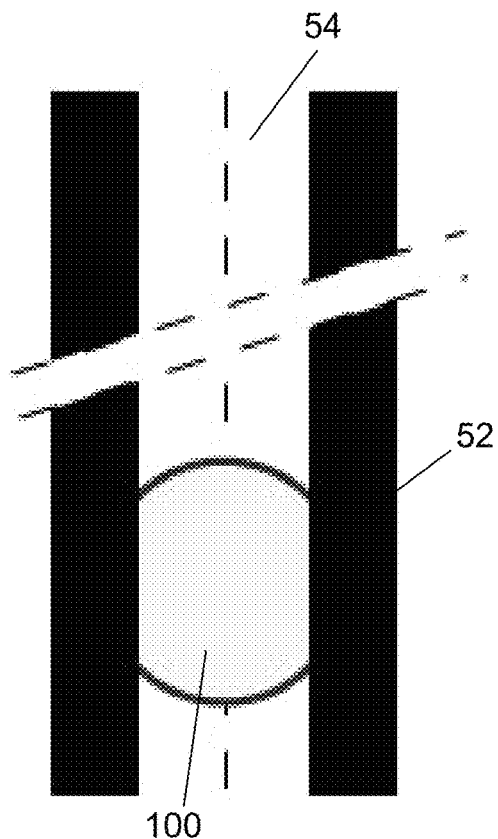
Figure 6:
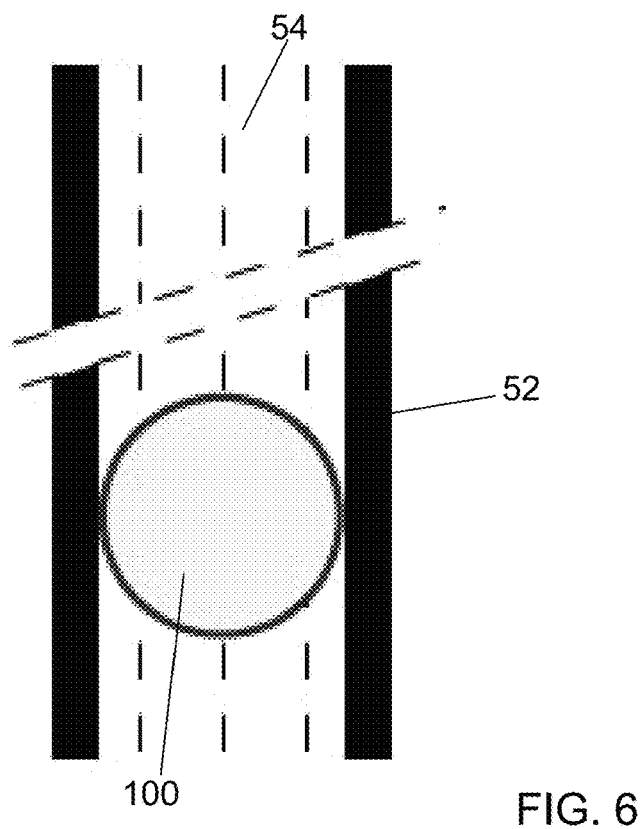
Figure 7:
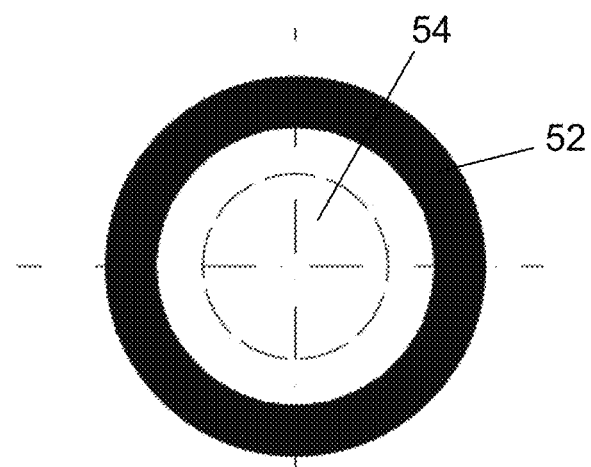
Figure 8:
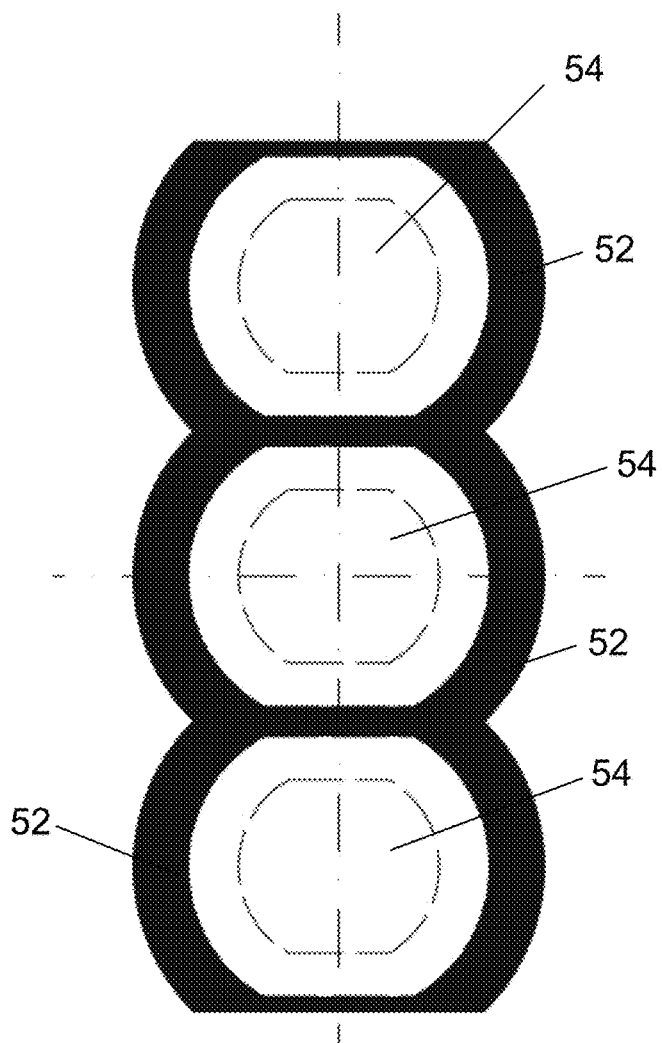
Figure 9:
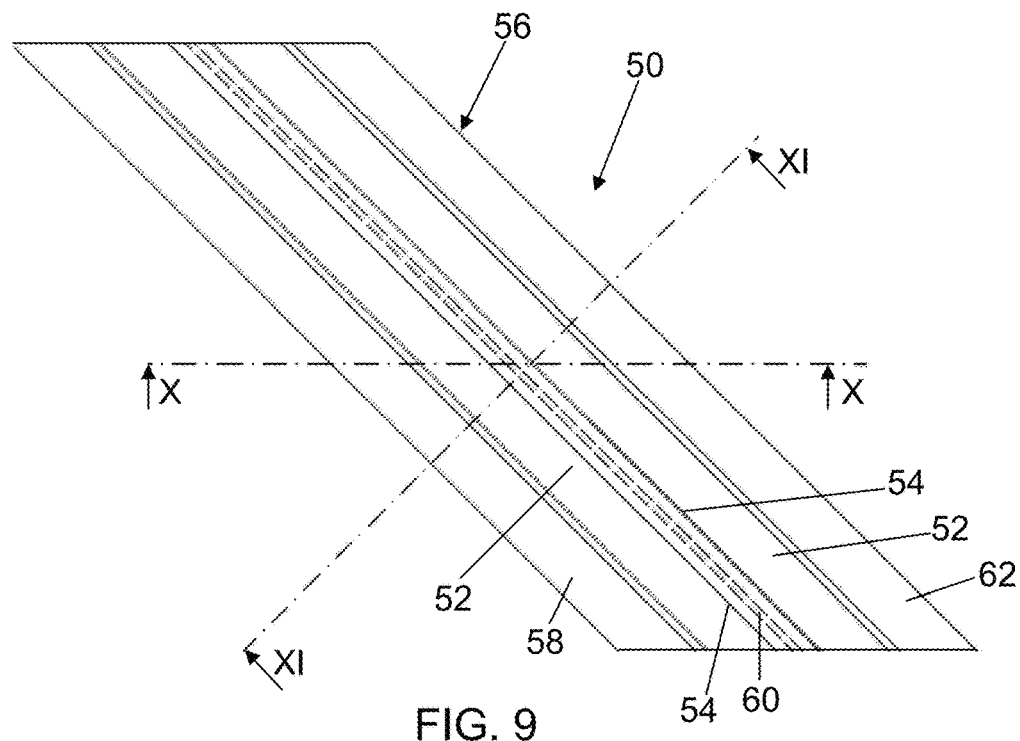
Figure 10:
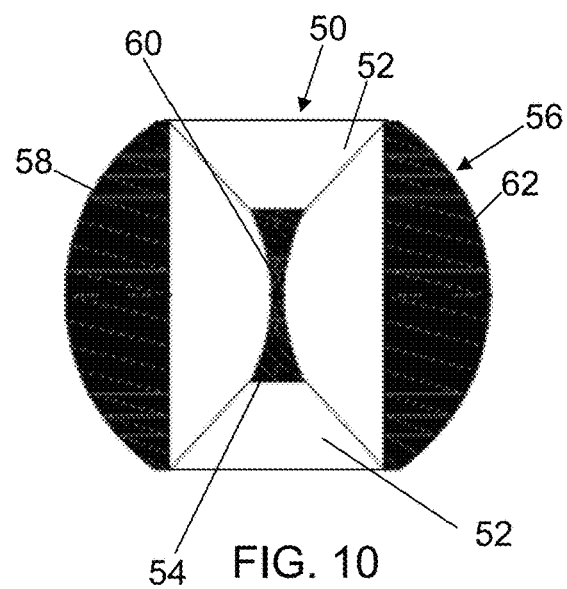
Figure 11:
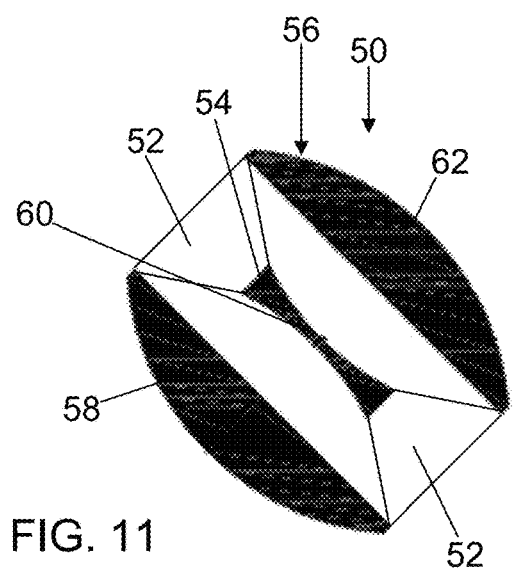

The present invention is further clarified hereinafter in terms of some preferred embodiments thereof, with reference to the accompanying drawings, in which:

FIG. 1 schematically represents binocular vision when a solid structural upright is present, in accordance with the known art, FIG. 2 schematically represents binocular vision when an installation according to the invention is present, FIG. 3 shows a horizontal section through the components of the installation according to the invention, FIG. 4 shows a vertical section through a first embodiment of the structural element of the installation according to the invention, FIG. 5 shows the binocular vision of an object through the aperture (diaphragm) of an upright without the optical system of the installation according to the invention, FIG. 6 shows the binocular vision of the same object as FIG. 5 seen through the aperture (diaphragm) of an upright in which the optical system of the installation according to the invention is installed, FIG. 7 shows a second embodiment of the structural element of the installation according to the invention, seen in the same view as FIG. 4, FIG. 8 shows a third embodiment thereof, seen in the same view as FIG. 4, FIG. 9 is a vertical section through the installation according to the invention, seen in lateral view, with the structural element inclined, FIG. 10 is a view thereof taken on the line X-X of FIG. 9, and FIG. 11 is a view thereof taken on the line XI-XI of FIG. 9.

As can be seen from FIG. 1, the presence of a vertical structural upright 2 within the visual field obstructs a zone thereof, to create the so-called blind zone 4. In particular, in the presence of an upright 2 in the form of a single piece, a blind zone 4 is obtained if the cross-section 5 of the upright 2 exceeds the distance 6 between the observer's eyes 8' and 8". Moreover, the width of the blind zone 4 depends on the cross-section 5 of the upright 2, the distance 10 between the observer's eyes 8' and 8" and the upright 2, and the projection 12 of the interpupillary distance in the direction of the upright.

As can be seen from Figures from 2 to 8, the installation 50 according to the invention comprises a structural element 52, for example a vertical or inclined upright, provided with a through aperture (or diaphragm) 54, at which an optical system 56 is applied comprising two convergent lenses 58, 62, between which a divergent lens 60 is centrally interposed.

In particular, the structural element 52, for example the vertical or inclined upright, is of the type which obstructs the observer's visual field when lying at a distance from the observer equal to or greater then the distance 6 between the observer's eyes 8', 8".

In particular, the optical system 56 comprises the following optical elements in sequence:

a plano-convex first lens 58 with its convexity facing outwards;

a double-concave central second lens 60;

a plano-convex third lens 62 with its convexity facing outwards and specularly opposing that of the first lens 58.

The optical system 56 is suitably configured such has to have a field angle (defined with respect to the centre of the central second lens 60) of substantially between 30° and 90°, preferably about 40°.

As shown in FIG. 3, hereinafter the term "axial length 40" of the optical system 56 means the distance, along the optical axis, between the outer vertices of the first lens 58 and of the third lens 62.

Preferably, the first lens 58 has a radius of curvature equal to one half of the axial length 40 of the optical system 56.

Preferably, the second lens 60 presents suitable symmetrical curvatures which are spherical or aspheric (i.e. defining a surface profile which does not pertain to a portion of a sphere or of a circular based cylinder).

Preferably, the third lens 62 has a radius of curvature which is equal to that of the first lens 58.

In greater detail, the flat portion of the first lens 58 and of the third lens 62 have dimensions substantially corresponding to those of the structural element 52.

The structural element 52 is divided into two portions separated from each other by the aperture (or diaphragm) 54, into which said double-concave second lens 60 is inserted and housed. The first lens 58 and the third lens 62 are suitably disposed in such a manner as to close the opposite sides of the aperture 54.

Preferably, the first lens 58 and the third lens 62 have refractive indexes ($n_d$) substantially between 1.43 and 1.63, preferably about 1.53, and an Abbe number ($V_d$) substantially between 37 and 67, preferably about 52. Preferably, the third lens 60 has a refractive index ($n_d$) substantially between 1.64 and 1.84, preferably about 1.74, and an Abbe number ($V_d$) substantially between 27 and 57, preferably about 42.

The light rays which pass through the optical system 56 are made to converge and be conveyed by the plano-convex third lens 62 towards the second double-concave lens 60 positioned at the central aperture 54 of the structural element 52 to which the optical system is applied. This enables the observer to achieve a doubled binocular visual field through the aperture (diaphragm) 54, to hence obtain a binocular vision 8', 8" without blind zones 4.

In greater detail, the increase in apparent binocular visual field is achieved by virtue of the apparent magnification of the light entry aperture or diaphragm 54 generated by the plano-convex lens 62. In other words, as represented in FIG. 3, the real aperture 42 of the diaphragm 54 is magnified, to hence obtain the apparent (or virtual) aperture 44.

Advantageously, the ratio of the real aperture 42 of the diaphragm 54 to the axial length 40 of the optical system 56 is substantially of 0.3-0.5, preferably of about 0.4, while the ratio of the apparent (or virtual) aperture 44 of the diaphragm 54 to the axial length 40 is substantially of 0.5-0.7, preferably of about 0.6.

The double-concave central second lens 60 annuls the convergence of the rays concentrated by the lens 62, by diverging the beam of entering rays to an equal extent but of opposite sign at the focal point of the lens 58 of the optical system 56. For this reason, the light beam leaving the optical system 56 is parallel to and of equal dimensions to the entering beam, but the angular dimensions of this latter are greater, by 50%, than those of the light beam which would enter a diaphragm 54 without the optical system 56.

In particular, if the optical system 56 were absent, the object 100 would be seen by the observer through the aperture (or diaphragm) 54, as is apparent from FIG. 5, i.e. with the lateral portions covered by the structural element 52; in contrast, the presence of the optical system 56 (which is present but is not represented in FIG. 6), enables the binocular visual field to be doubled such that the object 100 is seen through the aperture (or diaphragm) 54 in its entirety (as shown in FIG. 6) by the observer, located at a distance from the structural element equal to or greater than the interpupillary distance of the observer.

The lenses 58, 60 and 62 of the optical system 56 are positioned such that the overall system is of neutral afocal type, i.e. the system 56 does not have a focal plane of real or virtual convergence of the light rays, the object images, which are seen through the sequence of system lenses 58, 60 and 62, being unaltered in terms of position and apparent dimensions. This enables the width of the binocular visual field to be increased while at the same time having less optical aberrations.

If the aperture 54 defined in the structural element 52 is circular, the optical system 56 is formed as a spherical version (see FIG. 7). In particular, in this version, the contours of the three lenses 58, 60 and 62 have a substantially circular profile. The installation 50 according to the invention can also comprise a structural element 52 provided with a series of separate circular apertures 54, each of which is intended to house a corresponding optical system 56 in spherical version (see FIG. 8).

If the aperture 54 defined in the structural element 52 is of elongated rectangular shape, the optical system 56 is formed as a cylindrical version (see FIG. 4). In particular, in this version, the lenses 58, 60 and 62 are of elongated shape in the direction in which the rectangular aperture 54 extends, with the curved surfaces being cylindrical instead of spherical.

The cylindrical version of the optical system 56 is preferably applicable to structural elements or uprights 52 which are vertical or have an inclination equal to or less than 30° to the position of the observer, because beyond this angle, the inclined section of the system cylindrical version loses its neutrality.

For structural elements or uprights 52 which are inclined to the observation direction, for example by 45° (see FIG. 9), the optical system 56 is suitably extruded along the inclined development axis of the structural element or upright 52. In particular, the horizontal section (see FIG. 10) of the optical system 56 for an inclined structural element 52 corresponds to that provided for a vertical structural element 52, whereas the section of the optical system 56 formed in a plane perpendicular to the axis of development/inclination is as shown in FIG. 11.

Advantageously, the optical system 56 can be inserted into a circular aperture (or diaphragm) 54 of porthole type. This enables the binocular visual field to be increased by 50% without causing optical distortions which would result in shape altering, while at the same time reducing the aperture dimensions.

From the aforegoing it is apparent that the installation according to the invention is particularly advantageous, in that:

it enables the blind zone to be reduced and/or eliminated, it enables the robustness of the structural element to be maintained unaltered, while at the same time enabling its dimensions to be virtually reduced; in particular, this enables binocular vision to be obtained via an aperture (or diaphragm) of apparent dimensions greater than the real dimensions by 50%, if the structural element of the installation is the vertical upright of a motor vehicle, it enables the binocular vision of the driver (or passengers) not to be obstructed by said upright, and the images observed through the vehicle windscreen or side window to be perceived as continuous, it enables the binocular visual field to be increased without causing any optical distortion, this being particularly useful in the military and aeronautical sector, in which the metal structural elements, for example of a reconnaissance aircraft or of a terrestrial armoured vehicle, are particularly thick.

In particular, in contrast to the present invention, GB1493244 and U.S. Pat. No. 7,280,283 neither propose, nor in any way suggest, the use of a neutral afocal system to improve the visual field in the presence of a structural element.

In greater detail, in contrast to the present invention, GB 1493244 teaches the use of thin lenses in which, based on the ratio of thickness to focal length of the lenses involved, the conjugate point evaluation can be simplified by using synthetic optical formulas which ignore the effect of material thicknesses; in particular, the conditions required for applying these formulas are not suitable for the present invention, in which the total lens thickness is equal to more than 50% of the total length of the system.

Again in greater detail, in contrast to the present invention, the sequence of the four lens groups provided in U.S. Pat. No. 7,280,283 serves to correct and vary the beam vergency, given that the inclined and divergent entering beam leaves convergent and with a different aperture. In other words, this means that the lens system of U.S. Pat. No. 7,280,283 is not afocal and is not neutral. Moreover, given that the apertures in which the lenses of the third group are installed are identical, and in particular, the fact that that no diameter/aperture contraction is envisaged for the central negative element clearly demonstrates that these lens are in no way provided for improving the binocular visual field in the presence of a structural element.

Furthermore, both U.S. Pat. Nos. 4,892,399 and 4,257,670 relate to a door viewer, this being an application context completely different from that envisaged in the installation according to the present invention; in this respect, in the door viewer context, the observer has to bring the eye substantially in contact with the hole provided in the door, and in which the viewer optical system is installed, and moreover, this latter allows only monocular vision, requiring the observer to close the other eye, i.e. that not located in front of the viewer.

The invention claimed is:

1. An installation (50) for improving binocular visual field, comprising:
   a structural element (52) adapted to be located at a distance from an observer equal to or greater than the observer's interpupillary distance,
   wherein said structural element (52) is a vertical or inclined upright interposed between two transparent surfaces and is provided with at least one through aperture (54), in which an optical system (56) is applied comprising two convergent lenses (58, 62), and
   wherein a divergent lens (60) is centrally interposed between the two convergent lenses, the distance between each of said convergent lenses (58, 62) and said central divergent lens (60) being such as to render said optical system (56) of neutral afocal type.

2. The installation as claimed in claim 1, wherein said structural element (52) comprises two portions separated from each other by said through aperture (54).

3. The installation as claimed in claim 1, wherein said central divergent lens (60) is substantially coplanar with said aperture (54), said aperture (54) having two opposing sides closed by said two convergent lenses (58, 62).

4. The installation as claimed in claim 1, wherein said central divergent lens (60) is inserted into and housed within said through aperture (54).

5. The installation as claimed in claim 1, wherein said central divergent lens (60) has symmetrical spherical or aspheric curvatures.

6. The installation as claimed in claim 1, wherein:
   said two convergent lenses (58, 62) have refractive indexes ($n_d$) of 1.43-1.63, and an Abbe number ($V_d$) of about 37-67, and/or
   said central divergent lens (60) has a refractive index ($n_d$) of 1.64-1.84, and an Abbe number ($V_d$) of 27-57.

7. The installation as claimed in claim 1, wherein said optical system (56) has a field angle, defined with respect to a center of said central divergent lens (60) of 30°-90°.

8. The installation as claimed in claim 1, wherein said aperture (54) has a circular shape, said optical system (56) defining a substantially spherical shape.

9. The installation as claimed in claim 1, wherein said aperture (54) has a substantially rectangular shape, said optical system (56) defining a substantially cylindrical shape.

10. The installation as claimed in claim 1, wherein said structural element (52) is inclined in relation to an observation direction, said optical system (56) defining a substantially cylindrical shape extruded along an inclined axis of development of said structural element (52).

11. The installation as claimed in claim 1, wherein said optical system (56) is inserted into said aperture (54), which is circular and substantially of porthole shape.

12. The installation as claimed in claim 1, wherein said structural element (52) is the vertical or inclined upright of a motor vehicle and/or of an aircraft.

13. The installation as claimed in claim 1, wherein said structural element is a structural element (52) of a vehicle, of an aircraft, of a wall, or of a building.

14. The installation as claimed in claim 1, wherein:
   each of said two convergent lenses comprises a lens having a flat side and a convex side with a convexity facing outwards, and
   said central divergent lens comprises a double-concave lens (60).

15. The installation as claimed in claim 14, wherein said two convergent lenses (58, 62) have a radius of curvature corresponding substantially to one half an axial length (40) of said optical system (56), said axial length corresponding to a distance, along an optical axis, between outer vertices of the first lens (58) and of the third lens (62).

16. The installation as claimed in claim 14, wherein the flat side of said convergent lenses (58, 62) has dimensions substantially corresponding to those of the structural element (52).

17. The installation as claimed in claim 1, wherein said convergent lens (62), through which a light beam enters, causes magnification of said through aperture (54) from a real dimension (42) to an apparent dimension (44), hence increasing said binocular visual field.

18. The installation as claimed in claim 17, wherein:
a ratio of the real dimension (42) of said through aperture (54) to an axial length (40) of the optical system (56) is 0.3-0.5, and
a ratio of the apparent dimension (44), as defined by said convergent lens (62), of said through aperture (54), to the axial length (40) of the optical system (56) is 0.5-0.7.

\* \* \* \* \*